(12) United States Patent
Coles et al.

(10) Patent No.: US 7,509,395 B2
(45) Date of Patent: Mar. 24, 2009

(54) DATA DELIVERY

(75) Inventors: Alistair Neil Coles, Bath (GB); Eric Henri Ulysse Deliot, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1152 days.

(21) Appl. No.: 10/712,819

(22) Filed: Nov. 13, 2003

(65) Prior Publication Data
US 2004/0133630 A1 Jul. 8, 2004

(30) Foreign Application Priority Data
Nov. 14, 2002 (GB) ................. 0226573.4

(51) Int. Cl.
G06F 15/16 (2006.01)
(52) U.S. Cl. .............. 709/217; 709/203; 709/219; 709/225; 709/229
(58) Field of Classification Search ......... 709/203, 709/217, 219, 225, 229
See application file for complete search history.

(56) References Cited

U.S. PATENT DOCUMENTS

| 5,608,870 | A | | 3/1997 | Valiant ................. 711/100 |
| 5,649,092 | A | * | 7/1997 | Price et al. .............. 714/15 |
| 5,671,365 | A | * | 9/1997 | Binford et al. ........... 710/100 |
| 5,699,518 | A | * | 12/1997 | Held et al. .............. 709/229 |
| 5,706,507 | A | * | 1/1998 | Schloss ................ 707/104.1 |
| 5,745,781 | A | * | 4/1998 | Ekanadham et al. .......... 712/29 |
| 5,768,528 | A | * | 6/1998 | Stumm ................... 709/231 |
| 5,835,727 | A | * | 11/1998 | Wong et al. .............. 709/238 |
| 5,864,854 | A | | 1/1999 | Boyle .................... 707/10 |
| 5,878,228 | A | * | 3/1999 | Miller et al. ............. 709/235 |
| 5,918,013 | A | * | 6/1999 | Mighdoll et al. ........... 709/217 |

(Continued)

FOREIGN PATENT DOCUMENTS

EP 1100013 A2 5/2001

(Continued)

OTHER PUBLICATIONS

Coles et al., "A Framework For Coordinated Multi-Modal Browsing With Multiple Clients", Cambridge Research Laboratory, HP Laboratories Bristol, HPL-2002-30, Nov. 27, 2002; http://www.hpl.hp.com/techreports/2002/HPL-2002-330.pdf.

(Continued)

*Primary Examiner*—Phuoc Nguyen

(57) ABSTRACT

A system has at least two data-receiving applications running on one or more data-receiving devices. Each data-receiving application is capable of requesting and receiving data. A data-processing apparatus and a data-storage apparatus are also provided, the data-storage apparatus being connected to the data-receiving applications via the data-processing apparatus. The data-processing apparatus is arranged to receive a plurality of data-requests which form a request group from the data-receiving applications. The data-processing apparatus is arranged to evaluate the data-requests and to send a single request for the data-requests within the request group to the data-storage apparatus, and further arranged to receive data from the storage apparatus, in response to the single request. The data-processing apparatus is arranged to process and distribute the received data, or portions thereof, to at least one of the data-receiving applications.

36 Claims, 3 Drawing Sheets

U.S. PATENT DOCUMENTS

| | | | |
|---|---|---|---|
| 5,956,709 A * | 9/1999 | Xue | 707/3 |
| 6,832,239 B1 * | 12/2004 | Kraft et al. | 709/203 |
| 2003/0140113 A1 | 7/2003 | Balasuriya | 709/217 |

FOREIGN PATENT DOCUMENTS

| | | |
|---|---|---|
| GB | 2381338 | 4/2003 |

OTHER PUBLICATIONS

Gergic et al., "An Approach To Lightweight Deployment Of Web Services", Proceedings of the 14th international conference on Software engineering and knowledge engineering 2002 (SEKE 2002) ACM Press, pp. 635-640.

Great Britain Search Report Application No. GB 0326451.2, dated Dec. 12, 2003 and Great Britain Search Report Application No. GB 0226573.4, dated Aug. 4, 2003.

\* cited by examiner

US 7,509,395 B2

DATA DELIVERY

FIELD OF THE INVENTION

This invention relates to a method and associated apparatus for delivering data to one or more data-receiving devices, each of which may be running one or more data-receiving applications.

BACKGROUND OF THE INVENTION

It is known to deliver data to remote data-receiving devices using network connections such as for example an Internet (and in particular a World Wide Web) connection. Further, intermediaries such as Web-Cache intermediaries are known, which cache data between a server holding the data and a data-receiving device to which data will be delivered. Although the primary function of the Web Cache Intermediary is to cache data it can also prevent multiple requests for the same data being transmitted from the data-receiving device to the server.

Prevention of the transmission of multiple requests is particularly important in situations in which the server undergoes a state change following the receipt of the request for data from the data-receiving device i.e. the request for data causes the data held on the server to change. Such requests are not generally cached and include those those requests containing form data and the like. Examples of such a state change include the placing of an order on an online shopping site, etc., in which multiple orders can result if multiple requests are not blocked.

Further, the number of types of device and/or applications being used to make network connections is increasing. For example devices such as PDA's, PC's, web enabled televisions, mobile telephones, and the like are now being used to access information.

Indeed, it is known to use a plurality of devices in conjunction with one another to access information. That is an aggregations of access data-receiving applications that may be brought together to form a distributed user interface. For example, a PDA may be used in conjunction with a PC wherein the PDA is used much like a remote control to control the data sent to the PC, but the PC is used to display the information (for which it is much better suited because of its higher display capabilities).

SUMMARY OF THE INVENTION

According to a first aspect of the invention there is provided a system comprising at least two data-receiving applications running on one or more data-receiving devices, each data-receiving application being capable of requesting and receiving data, a data-processing means and a data-storage means connected to said data-receiving applications via said data-processing means, said data-processing means being arranged to receive a plurality of data-requests forming a request group from said data-receiving applications, to evaluate said data-requests and to send a single request for the data-requests within said request group to said data-storage means and further being arranged to receive data from said storage means, in response to said single request, process said received data and distribute said received data, or portions thereof, to at least one of said data-receiving applications.

An advantage of such a system is that it may be used to prevent said data-storage means from receiving a plurality of requests for data (data requests) by processing the requests made by the data-receiving applications to provide a single request. The single request may be arranged to contain requests for data suitable for the various data-receiving applications.

The, or each, data-receiving application may be arranged to run on a different data-receiving device, or indeed a plurality of data-receiving applications may be arranged to run on the same device. For example, a data-receiving device, such as a PC, may be arranged to run an Internet browser, together with an application streaming video. The browser and the streaming application each constitute a data-receiving application, but running on the same data-receiving device. One way of looking at the invention may be to facilitate co-ordinating the navigation of web resources across an aggregation of data-receiving applications (in which a data-receiving application may be running on separate data-receiving devices).

According to a second aspect of the invention there is provided a method of delivering and receiving data to and from two or more data-receiving applications running on one or more data-receiving devices, said method comprising receiving a plurality of requests for data, forming a request group, from said data-receiving applications using a data-processing means, evaluating said requests sending a single request to a data-storage means from the data-processing means and further comprising processing data received from said data-storage means in response to said single request using said data-processing means, and distributing said received data, or portions thereof, to at least one of said data-receiving applications.

According to a third aspect of the invention there is provided a processing means, which may provide the data-processing means of the first aspect of the invention, which comprises a receiving means and transmitter means, the receiver means being arranged to receive a plurality of data requests from a plurality of data-receiving applications, said plurality of data requests forming a request group, and also to receive data from a storage means, and the transmitting means being arranged to transmit data to said storage means and to transmit received-data received from said storage means to said data-receiving applications, further, said processing means being arranged to process requests for data received by said receiving means from said data-receiving applications, evaluate said requests and to produce a single request for the data-requests within said request group and generated by said evaluation and to cause said transmitting means to transmit said single request to said data-storage means and further to receive data from said data-storage means, process said received-data and to transmit said received data, or portions thereof, to at least one of said data-receiving applications.

According to a fourth aspect of the invention there is provided a method of requesting data comprising receiving a plurality of data requests from a plurality of data-receiving applications, said plurality of data-requests forming a request group, evaluating said requests and producing a single request for data, to a storage means, for said request group generated by said evaluation, receiving received-data in response to said single request from said storage means, processing said received-data and sending said received-data, or portions thereof, to at least one of said data-receiving applications.

According to a fifth aspect of the invention there is provided a computer readable medium containing instructions, which when read onto a computer cause that computer to perform the method of the second and/or fourth aspects of the invention.

According to a sixth aspect of the invention there is provided a computer readable medium containing instructions, which when read onto a processing means cause that processing means to function as the data-processing means according to the first and/or third aspects of the invention.

The computer readable medium of the fifth and/or sixth aspects of the invention may comprise any one or more of the following: a floppy disk, a CD, a DVD ROM/RAM (including +R,–R), a hard drive, a ZIP disk, any form of optical and/or magneto optical drive, a tape, a transmitted signal (including an Internet and/or ftp download, or the like), a wire.

According to a seventh aspect of the invention there is provided a computing device which comprises a receiver and transmitter, the receiver being arranged to receive a plurality of data requests from a plurality of data-receiving applications, said plurality of data requests forming a request group, and also to receive data from a store, and the transmitter being arranged to transmit data to said store and to transmit received-data received from said store to said data-receiving applications, further, said computing device being arranged to process requests for data received by said receiver from said data-receiving applications, identify said received data requests as belonging to the group, evaluate said requests and to produce a single request for the data-requests within said request group and generated by said evaluation and to cause said transmitter to transmit said single request to said data-store and further to receive data from said data-store, process said received-data and to transmit said received data, or portions thereof, to at least one of said data-receiving applications.

According to a eighth aspect of the invention there is provided a method of requesting data comprising receiving a plurality of data requests from a plurality of data-receiving applications, said plurality of data-requests forming a request group, evaluating said requests, identifying said received data requests as belonging to the group and producing a single request for data, to a store, for said request group generated by said evaluation, receiving received-data in response to said single request from said store, processing said received-data and sending said received-data, or portions thereof, to at least one of said data-receiving applications.

According to a ninth aspect of the invention there is provided a system comprising at least two data-receiving applications running on one or more data-receiving devices, each data-receiving application being capable of requesting and receiving data, a data-processor and a data store connected to said data-receiving applications via said data-processor, said data-processor being arranged to receive a plurality of data-requests forming a request group from said data-receiving applications, to identify said received data requests as belonging to the group, to evaluate said data-requests and to send a single request for the data-requests within said request group to said data store and further being arranged to receive data from said data store, in response to said single request, process said received data and distribute said received data, or portions thereof, to at least one of said data-receiving applications.

According to a tenth aspect of the invention there is provided a method of delivering and receiving data to and from two or more data-receiving applications running on one or more data-receiving devices, said method comprising receiving a plurality of requests for data, the plurality of requests forming a request group, from said data-receiving applications using a data-processor, evaluating said requests, determining a data-request as belonging to the request group, sending a single request to a data store from the data-processor and further comprising processing data received from said data store in response to said single request using said data-processor, and distributing said received data, or portions thereof, to at least one of said data-receiving applications.

According to a eleventh aspect of the invention there is provided a computing device which comprises a receiver and transmitter, the receiver being arranged to receive a plurality of data requests from a plurality of data-receiving applications, said plurality of data requests forming a request group, and also to receive data from a store, and the transmitter being arranged to transmit data to said store and to transmit received-data received from said store to said data-receiving applications, further, said processor being arranged to process requests for data received by said receiver from said data-receiving applications, evaluate said requests, identify said received data requests as belonging to the group and to produce a single request for the data-requests within said request group and generated by said evaluation and to cause said transmitter to transmit said single request to said store and further to receive data from said store, process said received-data and to transmit said received data, or portions thereof, to at least one of said data-receiving applications, wherein said computing device is arranged such that said evaluation comprises one of: postponing sending said single request until all requests within a request group have been received; sending said single request on receipt of the first request within a request group; monitoring requests within a request group and transmitting said single request when the computing device has received sufficient data to create said single request from data-requests made thereto; and merging data-requests received from said data-receiving applications such that said single request comprises a consolidated request comprising at least portions of said data-requests.

According to a twelfth aspect of the invention there is provided a processing means which comprises a receiver and transmitting means, the receiver being arranged to receive a plurality of data requests from a plurality of data-receiving applications, said plurality of data requests forming a request group, and also to receive data from a storage means, and the transmitting means being arranged to transmit data to said storage means and to transmit received-data received from said storage means to said data-receiving applications, further, said processing means being arranged to process requests for data received by said receiver from said data-receiving applications, identify said received data request as belonging to the group, evaluate said requests and to produce a single request for the data-requests within said request group and generated by said evaluation and to cause said transmitting means to transmit said single request to said data-storage means and further to receive data from said data-storage means, process said received-data and to transmit said received data, or portions thereof, to at least one of said data-receiving applications.

According to a thirteenth aspect of the invention there is provided a system comprising at least two data-receiving applications running on one or more data-receiving means, each data-receiving application being capable of requesting and receiving data, a data-processing means and a data-storage means connected to said data-receiving applications via said data-processing means, said data-processing means being arranged to receive a plurality of data-requests forming a request group from said data-receiving applications to evaluate said data-requests, identify said received data requests as belonging to the group and to send a single request for the data-requests within said request group to said data-storage means and further being arranged to receive data from said data-storage means, in response to said single request, process said received data and distribute said received data, or portions thereof, to at least one of said data-receiving applications.

According to a fourteenth aspect of the invention there is provided a method of delivering and receiving data to and from two or more data-receiving applications running on one or more data-receiving means, said method comprising receiving a plurality of requests for data, the plurality of requests forming a request group, from said data-receiving applications using a data-processing means, assessing said requests, identifying said received data requests as belonging to the group, sending a single request to a data-storage means from the data-processing means and further comprising processing data received from said data-storage means in response to said single request using said data-processing means, and distributing said received data, or portions thereof, to at least one of said data-receiving applications.

According to a fifteenth aspect of the invention there is provided a network comprising; a server; a plurality of data handling devices, each device being capable of communication with the server; a memory;

wherein the server is arranged to: receive a plurality of demands, forming a demand group, for data from at least two of the data-handling devices; identify said received data demands as belonging to the group; form a single demand for the plurality of demands; fetch data from the memory to satisfy the single demand; and supply the fetched data to at least one of the data handling devices.

According to a sixteenth aspect of the invention there is provided a server, the server being arranged to: receive a plurality of demands for data from at least two data-handling devices forming a demand group; identify said received data demand as belonging to the group; form a single demand for the plurality of demands; fetch data from a memory to satisfy the single demand; and supply the fetched data to at least one of the data handling devices.

According to a seventeenth aspect of the invention there is provided a method comprising: forming a demand group comprising an initial request for data from a data-receiving application and a request from at least one other data-receiving application, the at least one request being formed in response to the initial request; receiving the plurality of requests; forming a single demand for the plurality of requests; fetching data from a memory to satisfy the single request; and supplying the fetched data to at least one of the data handling devices.

BRIEF DESCRIPTION OF THE DRAWINGS

There now follows by way of example only a description of embodiments of the present invention with reference to the accompanying drawings of which.

DETAILED DESCRIPTION OF THE INVENTION

Figure 2:
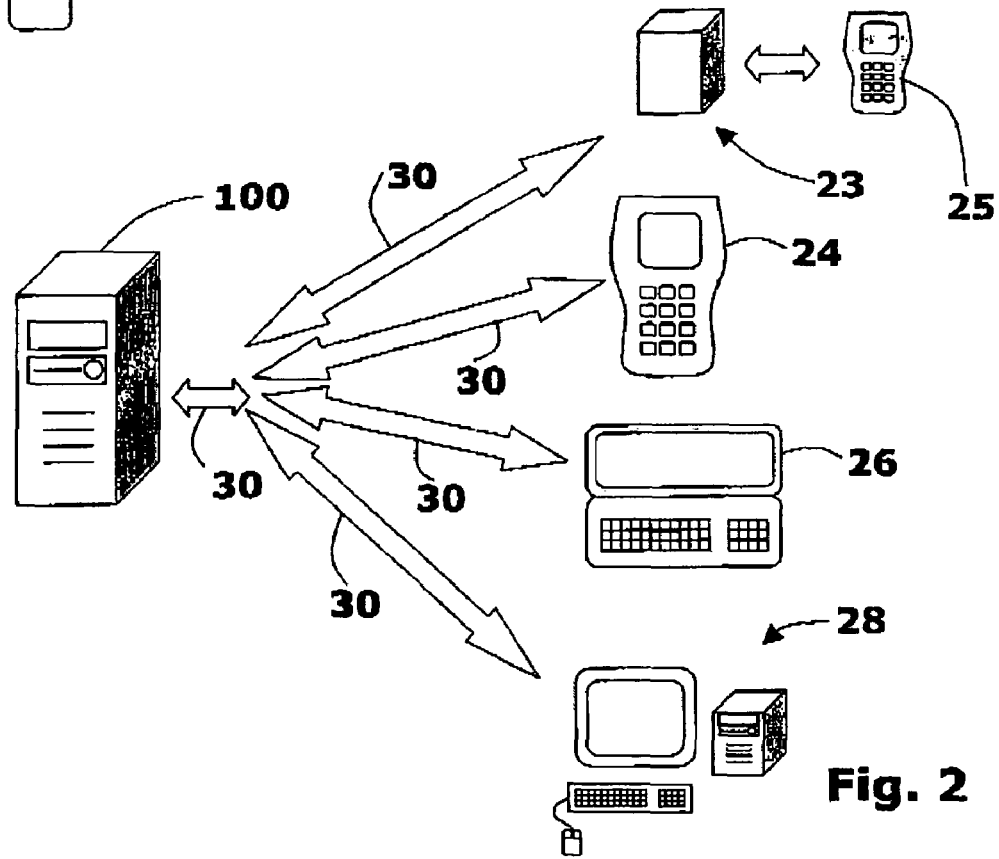
FIG. 2 schematically shows a prior art system in which data receiving devices communicate with a server.

Data is held on a storage-means or server 100, as shown in FIG. 2, and can be requested by any number of data-receiving devices that are capable of communicating with the server 100. Indeed, a first data-receiving device can make a request for data to be sent to a second data-receiving device.

Those skilled in the art will be familiar with the process of 'browsing' the World Wide Web (or in short the Web) running on top of the Internet. This process comprises navigating from one display of information, or 'web page' to another, each web page comprising a rendering of data usually stored in a remote location. Generally, the user moves between web pages using hyperlinks. The described embodiment is particularly concerned with browsing, where the web page, or other data, or a version web page and/or other data is rendered on a plurality of different data-receiving applications. The plurality of data-receiving applications and/or data-receiving devices may be thought of as an aggregation. The term data-receiving device and data receiving application is not intended to be limited to devices that can only receive data and such devices will often be able to transmit data as well as receive. The term is intended to cover applications/devices that can only receive data (i.e. have data pushed to them), and applications/devices that can both send and receive data.

The, or each, data-receiving application may be arranged to run on a different data-receiving device, or indeed a plurality of data-receiving applications may be arranged to run on the same device. For example, a data-receiving device, such as a PC, may be arranged to run an Internet browser, together with an application streaming video. The browser and the streaming application each constitute a data-receiving application, but running on the same data-receiving device.

If the user of one data-receiving application clicks or otherwise selects a hyperlink, the displays of other data-receiving applications may be arranged to change to indicate information displayed at this new location. As an example, a user may be using the Web with a first and a second device, each running a single data-receiving application, but linked in a single session. The first device may be a PC and the second device may be a PDA. The PDA may be being used as a "remote control" to control the data that is displayed on the PC such that when a link is activated on the PDA the display of the PC is caused to change to display the new information and also the display of the PDA is changed to offer the user with some new selections.

One of the requirements of rendering data across a plurality of data-receiving applications is that navigation synchronisation takes place i.e. that navigation operations on one data-receiving application are reflected on all other data-receiving applications in the aggregation.

A further example of which the teaching of this embodiment may be useful is when several users are viewing individual devices. The device may be similar or they may be different. For example, consider a lecturer where the students have individual display devices and the lecturer controls the display on each (this may in particular apply to 'correspondence' courses, where the students may not be in the same place as the lecturer).

Figure 1:
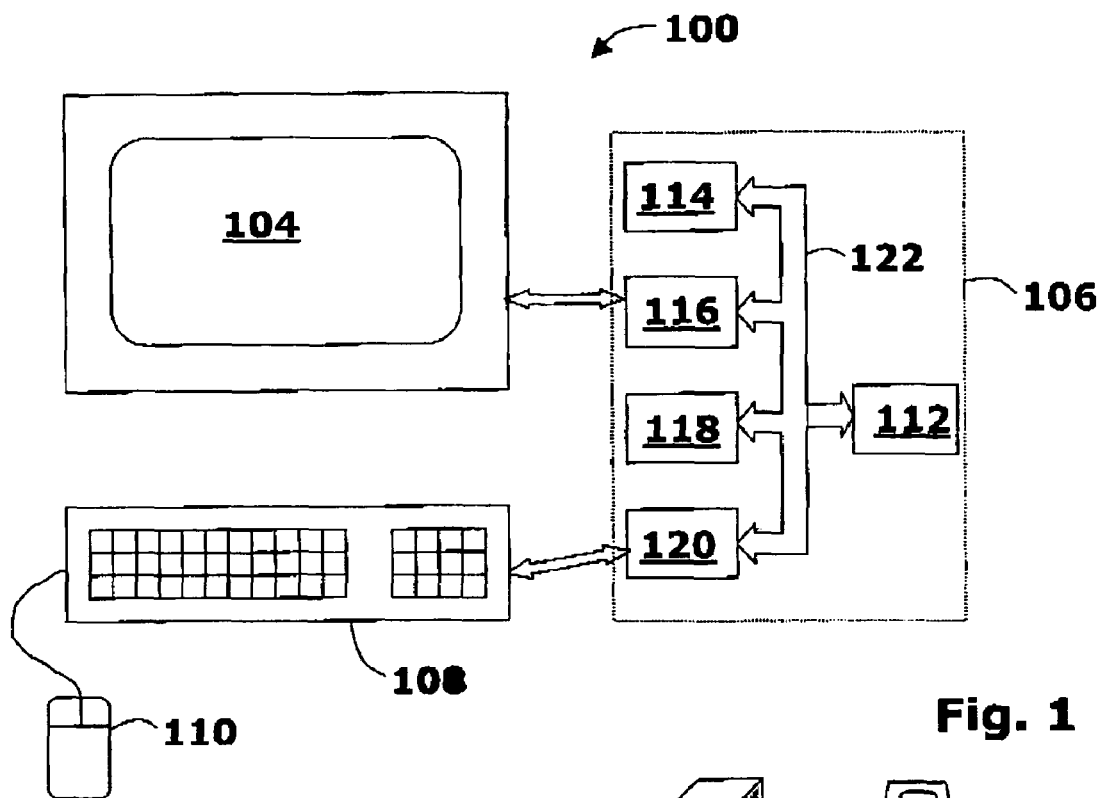
FIG. 1 schematically shows the architecture of a prior art computer capable of acting as a server for this invention.

As is shown in FIG. 1, the storage-means, or server 100, comprises a display 104, processing circuitry 106, a keyboard 108, and mouse 110. The processing circuitry 106 further comprises a processing unit 112, a hard drive 114, a video driver 116, memory 118 (RAM and ROM) and an I/O subsystem 120 which all communicate with one another, as is known in the art, via a system bus 122. The processing unit 112 comprises at least one and generally a plurality of processors which include those such as the INTEL™ PENTIUM™ series processors, running at typically between 2 GHz and 2.8 GHz.

As is known in the art the ROM portion of the memory 118 contains the Basic Input Output System (BIOS) that controls basic hardware functionality. The RAM portion of memory 118 is a volatile memory used to hold instructions that are being executed, such as program code, etc. The hard drive 114 is used as mass storage for programs and other data.

Other devices such as CDROMS, DVD ROMS, network cards, etc. could be coupled to the system bus 122 and allow for storage of data, communication with other computers over a network, etc.

The server 100 could have the architecture known as a PC, originally based on the IBM™ specification, but could equally have other architectures. The server may be an APPLE™, or may be a reduced instruction set computer (RISC) system, and may run a variety of operating systems (perhaps HP-UX, LINUX, UNIX, MICROSOFT™ NT, AIX™, or the like).

In prior art systems, when the server 100 receives a request for data from a data-receiving device it will forward the requested data to the appropriate data-receiving device. This is schematically represented in FIG. 2, which shows a connection to a voice portal 23, a WAP enabled telephone 24, a landscape oriented PDA 26 and a PC 28 in communication with the server via a network connection 30. This list of devices that can request data from the server as mentioned herein is not exhaustive and provides a first, second, third and fourth data-receiving device. Some examples of other devices may be screen projectors, finger print scanners, Internet televisions, digital cameras, etc.

It will be appreciated that each of the data-receiving devices 23, 24, 26, 28 shown in FIG. 2 has different capabilities. The voice portal 23 is only able to provide and receive data to a user thereof in audio format. In this example, the portal 23 is provided with software capable of receiving and interpreting VoiceXML which enables voice access, control and inputs to a website. The PC 28 is not so limited, having the highest display capabilities of the devices listed. As each of the data receiving-devices has a different practical use, the way in which a web-site is rendered or otherwise reproduced may advantageously be tailored for each device.

This is advantageous for two reasons.

Firstly, a document arranged for display on one of the devices will not necessarily be reproduced correctly on the other devices. Secondly, it may not be appropriate to display specific data on certain devices. To give an example of this second point, a person giving a lecture may wish to see the answers of questions that they are posing to the students to whom they are lecturing. It would of course not be appropriate for the students to see the answers as well as the questions.

Alternatively, or additionally, it may be that some data from a web-site may usefully be 'portable' for a user-consider for example a sales person, for whom it would be advantageous to carry sales prices, which may be up-dated from time to time. The sales person may not need, for example, a picture from the web-site, indeed, most portable devices have restricted memory capabilities, when compared to data-receiving devices such as the PC 28, and it is desirable to carry only the minimum data required on a device such as the PDA 26.

An example of a voice portal 23 is that provided by Tellme Networks Incorporated. In practise, such a portal is likely to be accessed using a telephone or a mobile telephone 25.

An example of a WAP enabled telephone 24 is the NOKIA™ 7110 that has a black and white display of 96×65 pixels, but only 96×44 pixels are available for body data providing four lines of text at roughly 15 characters per line. The telephone is provided with a keypad through which data can be input thereto. A WAP enabled telephone 24 has restricted capabilities for storing and for processing data.

In this example the PDA 26 is a Compaq™ iPAQ™ that operates using the Microsoft™ PocketPC™ operating system, and runs Microsoft™ Pocket Explorer as its means of communicating with the server 100. The iPAQ™ has a virtual keyboard, as well as a touch screen input, and can access the web, etc. using modem, or network cards connected through its PC card slot or via its infrared link, or Bluetooth™ link. The screen of the iPAQ™ can display colour (64 k colour) and has a resolution of 320×240 pixels (i.e. landscape). (It is also possible for the PDA to have a portrait perspective screen).

The PC 28 may have an architecture similar to that shown in FIG. 1. Its display is likely to be able to display 24-bit true colour (in excess of 16 million colours) at a resolution of at least 1024×768. Typically, a PC has superior storage and processing capabilities when compared to a PDA.

The person skilled in the art will appreciate that a request for data may cause a 'state change' on the server 100. For example the request for data may place an order, modify account details, or the like. Therefore, not only is the requested data supplied, but also some processing may be performed-for example updating account details. In other words, the server 100 itself is affected by a request for data. Therefore, it is desirable not to send multiple versions of the same and/or related request from different data-receiving applications, within the same aggregation of data-receiving applications, because the server may (due to a state change that has occurred) not respond to the requests in the same way, or multiple occurrences of the requested action may occur. It will of course be appreciated that servers 100 routinely handle multiple requests from data-receiving applications which are not in the same aggregation (e.g. requests received at a server for the same web page). Causing the server 100 to receive multiple requests is also likely to increase the processing burden of the server 100.

Figure 3:
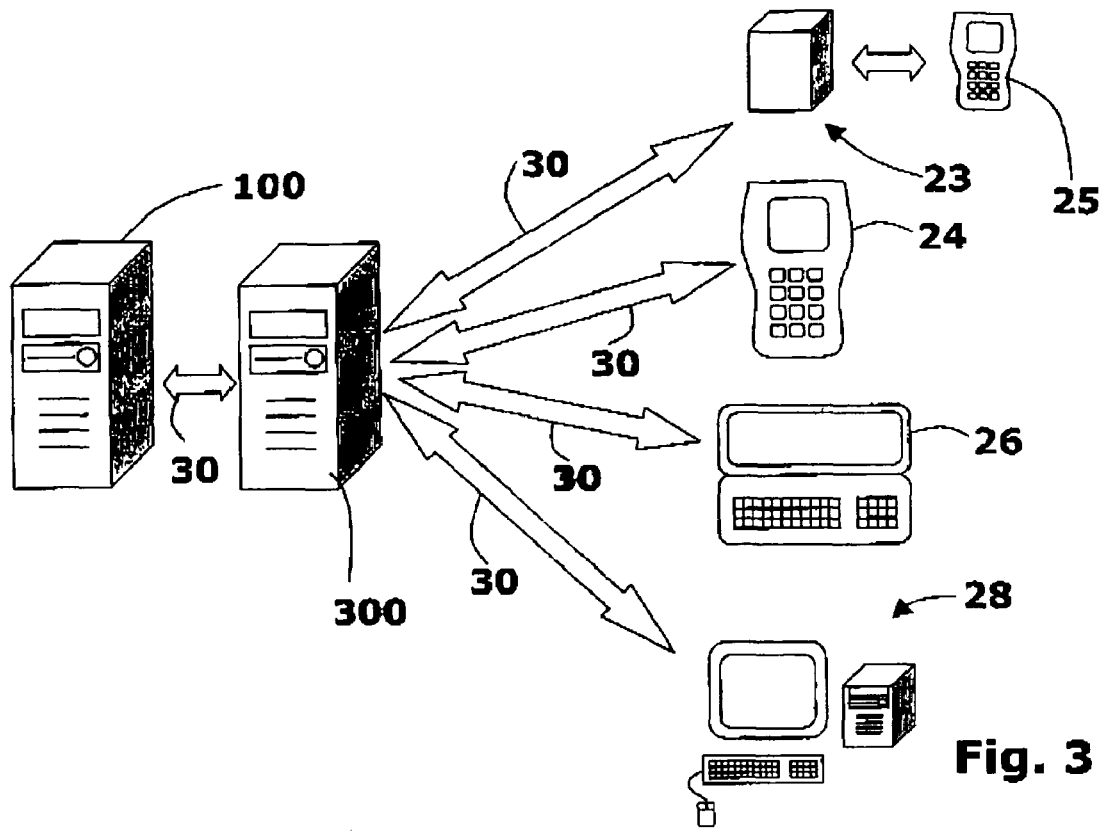
FIG. 3 schematically shows a system in which data receiving devices communicate with a server via a proxy server.

As shown schematically in FIG. 3, there is provided a data-processing means, in this case a proxy server 300, which may have an architecture similar to the server 100 in FIG. 1. Although described as a separate server 300 in this embodiment, the skilled person will appreciate the proxy server 300 may be provided by a data-receiving application running on a data-receiving device 23,24,26,28, or may be by a data-receiving application running on the server 100 as will be described hereinafter. Either embodiment of providing a proxy server 300 or a data-receiving application provide a data-processing means, which advantageously is a stateless data-processing means, to facilitate synchronised navigation of a plurality of data-receiving applications.

The data-processing means 300 receives requests from one or more of the requesting data-receiving devices, consolidates these (if there are more than one) and forwards the consolidated request to the server 100. The server responds by providing the information requested in the form required by each device to the data-processing means 300, and this is then distributed to the data-receiving devices.

In the described embodiment communication between the data-processing means and the data-receiving application is made using http (Hyper Text Transfer Protocol) http is advantageous because http requests are well known and readily available to current devices. The skilled person will appreciate the http covers several different version including http 1.0, http 1.1, and that there are variants such as https. It is intended that the term http covers all of these versions and variants. Further, the list given herein is not intended to be exhaustive.

Further, the data-processing means is not required to maintain persistent state for each aggregation of data-receiving applications. That is the data-processing means does not need to maintain a list of devices with which it is communicating. The requirement not to maintain persistent state is advantageous because it makes the arrangement more scaleable. That is as the length of the list of devices grows (there could conceivably be many thousands or millions of aggregations in communication with a data-processing means) then the requirement for processing power and storage increase simply to hold the list if persistent state is required. If persistent state is not required then requirement then the burden upon storage and processing power is not likely to be increased as much as the number of aggregations increases.

Figure 4:
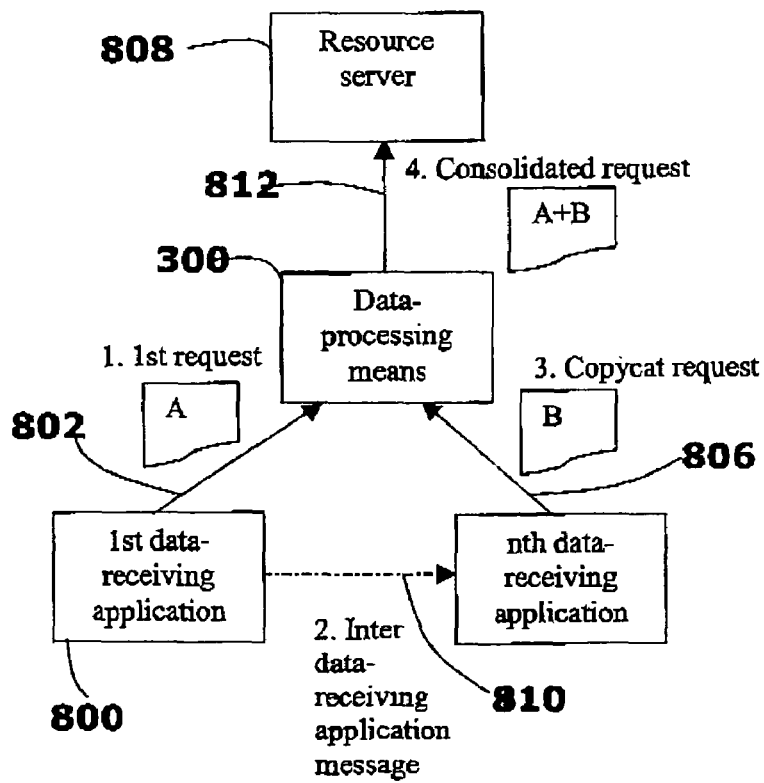
FIG. 4 schematically shows an overview of one method of combining data requests at a data-processing means.

This is described in greater detail below and with reference to FIG. 4. A data-receiving application 800 initiating the navigation operation issues an http request 802 to a target resource 808 and also stimulates all other data-receiving applications to issue copycat requests 806 to the same target resource 808. The copycat requests may contain at least part of the initial request and may be substantially a copy of the initial request. The initial 802 and copycat 806 requests form a request group. (Only two data-receiving applications are shown in the aggregation of FIG. 4, but there could be any number). In this embodiment to allow the copycat requests 806 to be stimulated one or more inter data-receiving application messages 810 are required. The inter data-receiving application messages 810 are provided by any suitable mechanism. Mechanisms that may be particularly suitable include Session Initiation Protocol (SIP), http, Short Message Service (SMS), Multi-media Message Service (MMS), or any other suitable mechanism. This list is not intended to be exhaustive and is simply intended to give the skilled person an impression of the technologies conceived at this stage.

Both the initial 802 and copycat requests 806 are sent to the data-processing means 300. Without a data-processing means 300, the initial 802 and copycat requests 806 would all propagate to the target resource 808, which may create two problems:

1. The load at the resource server increases by a factor of N for an aggregation of N data-receiving applications.
2. The resource may receive multiple non-idempotent requests, and for correct operation would need to resolve these (somehow) to a single operation e.g. multiple copycat POST requests should only cause one book to be ordered from an e-commerce application (POST is a mechanism for placing form data into the body of a message)

The skilled person will appreciate the meaning of the terms "idempotent" and "non-idempotent" but for completeness they are as follows: an idempotent request made to a server has the same effect whether it is made once or repeated, whereas a non-idempotent request may have a new effect if repeated. As an example, an instance of an order to an online store should be idempotent. It would be desirable to block multiple orders placed accidentally and so the first request should be accepted and it is desirable that subsequent repeat requests have no further effect.

Both of these problems may be addressed by routing the http requests via a data-processing means 300 which consolidates data-receiving application requests.

Web-cache intermediaries are already widely used to prevent multiple requests for the same resource propagating to the resource server 100,808. Once one data-receiving application request has prompted the resource to return a cacheable entity, a caching proxy is able to intercept and respond to subsequent requests from any data-receiving application for the same entity. A caching proxy may similarly be used as a data-processing means to intercept copycat requests 806.

However, conventional web caching is only successful when subsequent data-receiving application requests occur after a response to the initial 802 request has been returned. This is likely when requests originate from data-receiving applications operating somewhat independently, but unlikely when copycat requests 806 originate from an aggregation of data-receiving applications. The copycat requests 806 are likely to reach the caching proxy before a response to the initial request 802 has been received, resulting in a cache miss.

Therefore in a first embodiment for an aggregation of data-receiving applications copycat requests 806 may be stimulated only after the response to the initial request 802 has been received at the data-receiving application 800 initiating the initial request 802. This should guarantee that the response is in the cache before the copycat requests 806 reach the caching proxy, or data-processing means 300.

In a second embodiment for an aggregation of data-receiving devices copycat requests 806 are stalled at the caching proxy, or data-processing means 300 i.e. the data-processing means only forwards the initial request 802 and waits until it has cached the response to that request before servicing the copycat requests 806. This should also result in a cached response being available for the copycat requests 806. This process provides a request consolidation, which advantageously resolves all requests belonging to the same request group, and stalls all but the initial request 802. Stalling may be thought of as neither transmitting to said data-storage means nor responding to said data-request.

The second embodiment described may be advantageous for the following reasons: waiting for the first response before stimulating copycat requests 806, as in the first embodiment, introduces latency. It cannot be assumed that all data-receiving applications are 'close' to the data-processing means (i.e. low latency between data-receiving application and data-processing means, in this case a proxy server) and therefore, significant delays may be introduced.

Secondly, it may be advantageous to enable request body consolidation at the data-processing means 300 e.g. to merge the message bodies of POST's from multiple data-receiving applications. This would require that all requests (initial 802 and copycat 806) within a request group to be received at the data-processing means 300 before the data-processing means 300 forwards a request to the resource server 808.

The skilled person will of course appreciate that not all responses are cacheable. In particular, responses to POST requests and GET requests with query parameters ('?' parameters appended to the URI) are typically not cached. This is because the response to these requests is assumed to be 'dynamic' and dependent upon the content of the POST message body or GET parameters. However, it is particularly advantageous that multiple copies of these, potentially non-idempotent, do not reach the resource server 808.

Generally it would not be appropriate to return the cached response to one data-receiving application's POST in response to another data-receiving application. However, in the case of a copycat request 806, regardless of the request method, a copy of the resource server's 808 response to the lead initial request 800 is always cached and returned in response to copycat requests 806 which have been initiated by an inter data-receiving application message 810 following an initial request 802 (i.e. are in the same request group). This may help to ensure that only one request of any request group is propagated to the resource server 808.

It will be appreciated that, due to latencies in the system, the data-processing means 300 may receive a copycat request 806 before it receives the initial request 800. However, for the sake of clarity the notation is maintained.

In the embodiment being described some cache entries (e.g. those for POST responses) are indexed against a request group identity, which is preferably unique to that request group. Such entries may be expired from the cache as soon as all requests in the request group have been serviced.

Further, the data-processing means 300 may merge the contents of the initial 302 and copycat 806 requests. This may be advantageous in situations in which the resource server 808 distributes a form, or other such data, across multiple variants, such that one data-receiving application presents an interface to one fragment of the form data whilst another data-receiving application presents an interface to another fragment. In such arrangements it is convenient that when the form is submitted, the various fragments are amalgamated into a single message body that is sent to the resource server 100 in a single request.

Some embodiments may not involve the data-processing means 300 in this consolidation process. Because the data-receiving applications are able to communicate directly with each other, it would be possible for the data-receiving applications to update each other with changes to their respective form data fragments. Therefore, at any point in time any data-receiving application may be able to construct a full representation of the form data and submit it to the resource (via a GET or POST request).

In an alternative embodiment each of the data-receiving applications submit their data fragments to the data-processing means 300 in the body of their individual request and the data-processing means 300 merges the data before forwarding a single request to the resource server 100. This is as shown in FIG. 4, where it can be seen that the initial request contains data A, the copycat 806 request contains data B and a single request 812 sent to the resource server 808 contains data A+B. To achieve this, the data-processing means 300 waits to receive all requests within the same request group before forwarding a request to the resource server 808. In addition to the request group identity, the data-receiving applications therefore communicate to the data-processing means the number of data-receiving applications in the aggregation.

The second embodiment in which the data-processing means 300 consolidates the data is advantageous because some data might be large making it undesirable to continuously update all data-receiving applications with changes when some data-receiving applications may not present an interface to those components of the form. Secondly, some data might be sensitive (private), making it undesirable to share across all data-receiving applications. The skilled person will appreciate that the user may not own each of the data-receiving applications and/or data-receiving devices running the data-receiving applications within the aggregation and that therefore, privacy may be of high importance.

The data-processing means 300 may be arranged to resolve, or at least attempt to resolve, all data conflicts that occur in data-requests made to the data-processing means from data-receiving applications such that the request sent to the resource server 808 does not have any conflicts therein. The data-processing means 300 may thus, try to ensure that data passed to it in the data-requests is mutually consistent or mutually exclusive.

The data-processing means may not store the number of data-receiving applications in the aggregation between requests. It is advantageous for the data-processing means 300 to have this number as it allows the data-processing means 300 to determine when all requests in a request group have been serviced, and remove associated cache entries. The number of data-receiving applications in an aggregation may be dynamic and change between requests.

In a further alternative, or additional embodiment, one of the data-receiving applications may act as a "master" data-receiving application. This is useful for the purposes of submitting form data, or in embodiments in which the capabilities of the data-receiving applications/devices are passed to the data-processing means as will be described hereinafter.

Figure 5:
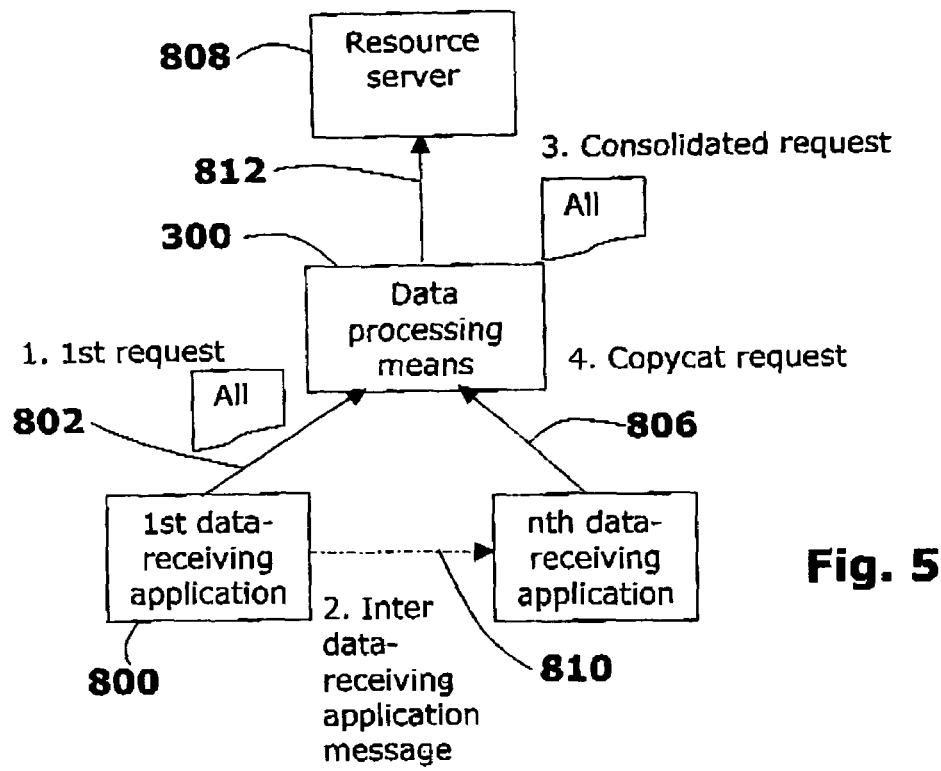
FIG. 5 schematically shows an overview of a further method of combining data requests at a data-processing means.

In the case of form data the master data-receiving application would maintain a complete copy of the form data which would be updated through inter data-receiving application messages 810. Other data-receiving applications might only maintain a fragment of the form data. In this embodiment whenever a "submit" is triggered by user interaction, which causes the form data to be sent to the data-processing means, the submit task is delegated to the "master" data-receiving application. The master data-receiving application generates the initial request 802 complete with form data, which the data-processing means 300 forwards to the resource server 808. All other data-receiving applications generate copycat requests 806 that do not need to carry any form data. Such an arrangement is shown in FIG. 5.

In such embodiments the data-processing means 300 is capable of distinguishing between the initial 802 request and the copycat 806 requests. In general all the embodiments described are facilitated by having the data-receiving application 800 communicate the status of their request to the data-processing means 300. That status may be one of: 1. Complete data for the form (and/or application/device capabilities) 2. Partial data for the form (and/or application/device capabilities).

On receiving a complete data request, the data-processing means 300 forwards it to the resource server 808 and stalls (does not pass on nor respond to) all subsequent, copycat 806, requests in that request group. Alternatively, on receiving a partial data request (whether initial 802, or copycat 806), the data-processing means 300 stalls the request 802,806 until it receives all requests 802,806 in that request group (at which point it merges partial data fragments (i.e. portions from each partial data-request) into a single request 812) or until it receives a complete data request in the same request group (which it forwards).

In order to allow the data-processing means 300 to determine whether a request 802,806 originates from the same group of requests (i.e. has been triggered by an inter data-receiving application message 810 following an initial request 802) it is convenient to generate a unique (at least to the data-processing means 300) request group identity for each request group.

In some embodiments the request group identity is generated by the data-receiving applications, for example it could be a concatenation of the user's email address and a unique string (fred_bloggs@hp.com/abcdefg). Alternatively, or additionally, in a second embodiment the request group identity could be generated by the data-processing means 300. Each data-receiving application may receive a new request group identity in a header of the response to the current request, and uses the new identity for the next request. In such a second embodiment it may be convenient for an initial (non-group) request to the data-processing means 300 to bootstrap the process.

It would generally also be necessary to communicate the request group identity from data-receiving applications to the data-processing means. In a first example this may be achieved via use of a header to the request. This may be via the http "From" header.

In an alternative, or additional, second embodiment the request group identity could be passed via the request URL. The data-receiving application could append the request group identity as a parameter to the URL (e.g. http://www.foobar.com/index.html?ReqID=abcdefg). This request group identity may subsequently be stripped off by the data-processing means 300. This is second embodiment is advantageous because it is transparent to the http stack, but has the problem that the chosen parameter may clash with a parameter name that is already included in the URL (e.g. a form variable that has name=ReqID).

In addition to the request group identity (which generally indicates that the data-requests within the group belong to the same request—for example request number 3 by aggregation x), it is also possible for the data-receiving application and/or data-receiving device to add an application/device identity to a data-request, which identifies the data-receiving application/request that made that data request. It is envisaged that the request group identity is in addition to the URL (or other indication of the source of the data) requested in the data-request which will generally be common to all data-requests within a data-request group.

The data-processing means 300 is used to consolidate data-receiving application requests 802,806 into a single request 812 to the resource server 808. This consolidation is desirable as it ensures that any side effects that the request might have on the resource (e.g. committing an e-commerce transaction, posting a message to a bulletin board) only occur once. The consolidation also results in a single response being returned by the resource server 808, which usually contains a 'representation' of the resource's state.

As discussed above, the aggregation of data-receiving applications may be run on a plurality of different data-receiving devices 23,24,26,28 each having different capabilities. Therefore, the system may need multiple representations of the data to be returned from the resource server 808. Generally, each representation of the data is adapted for a specific set of application/device capabilities (e.g. screen size, audio etc). The capabilities may be passed to the data-processing means and processed in a similar manner to how form data is processed. Each data-receiving device/application will have a profile of capabilities and the aggregation of data-receiving applications/devices will have a profile.

The aggregation profile may be constructed at the data-processing means 300 in a similar fashion to the processes described above which describe how the consolidated request may be made to the resource server 808 in relation to form data i.e. wait for all requests with the same request group identity and include all profiles in the consolidated, or single, request 812 to the resource server 808.

However, for the avoidance of doubt one data-receiving application may act as master and hold a complete list of data-receiving application/device profiles for the devices/applications within the aggregation. Alternatively, each data-receiving application may send a portion of the aggregate profile, generally the profile for itself/the device on which it is running, in requests made to the data-processing means. The data-processing means 300 stalls making a request to the resource server 808 until a complete list is available (whether by receipt of a complete list from the master data-receiving application, or whether by the building of a complete list from receipts of partial lists).

Secondly, data will generally be adapted according to the collective capabilities of the aggregation of data-receiving devices e.g. the data for a VoiceXML browser is dependent upon the presence of another data-receiving application that is capable of rendering HTML. For example, with only a VoiceXML data-receiving application available, the content for that data-receiving application may be:

```
<VXML>
    <form>
        <field name="pizza">
            <prompt>Please say the type of pizza you would like.
            You can choose from Pepperoni, Hawaiian, Four Cheese, ..
            </prompt>
        </field>
    </form>
</VXML>
``` whereas if an HTML data-receiving application is also available the content may be:

```
<VXML>
    <form>
        <field name="pizza">
            <prompt>Please say the type of pizza you would like.
            You can choose from thelist on the screen.
            </prompt>
        </field>
    </form>
</VXML>
``` and the corresponding HTML may be:

```
<html>
    <body>
        <form>
            <input type="radio" name="pizza" value="Pepperoni">Pepperoni</input>
            <input type="radio" name="pizza" value="Hawaiian">Hawaiian</input>
            <input type="radio" name="pizza" value="FourCheese">Four Cheese</input>
        </form>
    </body>
</html>
```

VoiceXML is a subset of XML and follows the principles of XML. VoiceXML is designed for creating audio dialogs that feature synthesized speech, digitized audio, recognition of spoken and DTMF key input, recording of spoken input, telephony, and mixed-initiative conversations.

Although the skilled person will be fully conversant with VoiceXML a full description can be found at http://www.w3.org/TR/voicexm120/.

XML requires pairs of tags, or identifiers, to be placed within a document. Theses tags do not specify how the information should be presented, but specify the content of the information between the pairs of tags. The skilled person will fully understand XML, but a full description can be found at http://www.w3.org, and the brief description below will aid his/her understanding. An archive of this site may be found at http://web.archive.org/web/*/http://www.w3.org which also contains information about XML.

The skilled person will appreciate how data written as an XML document is structured: written in words, or data sub-items, which are collected into data sub-item groups. The data sub-item groups can comprise sentences, paragraphs, or simply collections of words. The data sub-item groups, or even just data sub-items, are placed between pairs of tags, or identifiers.

The tags, or identifiers, appear as follows: <variable>, and </variable>, with variable being any word, or character string acceptable according to the XML recommendation. Further, each data sub item group can be itself broken down into a number of sub-items. This structure is convenient and allows for easy manipulation and searching of the complete data item. Each data sub-item group may of course be considered as a portion of the data.

HTML and XHTML are subsets of XML and the above discussion of XML is applicable.

It may be advantageous to adapt the data received by the data-processing means 300 from the resource server 808 according to the number of data-receiving applications in the aggregation. This may be the case even if the data-receiving applications have identical, or substantially identical, capabilities e.g. additional data may be included to assist in synchronisation of multiple data-receiving applications.

For example if the aggregation has only one data-receiving application which is capable of rendering HTML, the content for that data-receiving application might be:

```
<ev:listener ev:target="foo" ev:event="click"
ev:handler="#clickHandler"/>
<input id="foo"/>
<script id="clickHandler">
    <!-- execute some event handling functions -->
</script>
```

The skilled person will appreciate that this XML is composed of elements from the HTML and XML Events XML vocabularies which instruct a data-receiving application to render a textbox input form control and to capture mouse 'click' events that occur on that textbox. The events are routed to an event handler declared within the <script> element If two HTML data-receiving applications are available, the content for each of them might be:

```
<ev:listener ev:target="foo" ev:event="click"
ev:handler="#clickHandler"/>
<input id="foo"/>
<script id="clickHandler">
    <fork to="anotherBrowser" ev:handler="#anotherClickHandler"/>
    <!-- execute some event handling functions -->
</script>
```

As the skilled person will appreciate, when two or more data-receiving applications are present, the data includes additional XML (illustrated here by a possible new element called <fork>, but this is just an example) which instructs the data-receiving application to distribute the click event to another event handler that is contained in data that has been transmitted to another data-receiving application. This enables events to be distributed among several data-receiving applications. Generally, in order for data to be adapted for anyone data-receiving application it is convenient if the adaptation function is aware of the capabilities of all data-receiving applications in the aggregation.

Furthermore, it is convenient if the adaptation function is aware of the distribution of capabilities across the data-receiving applications and/or data-receiving devices. Generally it will not be sufficient to know that the aggregation of data-receiving applications is capable of rendering HTML and VoiceXML and it will generally be necessary to know whether one data-receiving application is capable of rendering HTML while another is capable of rendering VoiceXML, or whether both data-receiving applications can render both HTML and VoiceXML. It will of course be appreciated that VoiceXML and HTML are merely examples of mark-up languages that may be used and any other mark-up language is equally possible.

Therefore, the data-receiving devices and/or applications within an aggregation will have a so called aggregation profile which can be used specify the composite make-up of the aggregation and the profiles of data-receiving devices within the aggregation.

In some existing web applications the adaptation function is performed at the client (the data-receiving application). In an embodiment realising this invention, to achieve such client side adaptation, the server 808 returns a generic response that contains an abstract description of the data (e.g. XML). This would typically include an inline reference to a stylesheet (XSLT or CSS) that the data receiving application 800 applies to transform the abstract data to data receiving application-specific variant.

In many existing web applications content is adapted at the server before being returned in the http response. In an aggregation of data-receiving devices, in which a single request 812 is generated as described herein, then the semantics of the single request 812 should be extended from "return a representation of the requested data, often referred to as a resource, (suitable for this data-receiving application profile) to "return representation(s) of the requested data (resource) suitable for a list of data-receiving devices/applications". In one embodiment the single request 812 carries multiple data-receiving application profiles (which may mean including the aggregation profile) and the corresponding response 900 return multiple variants of the data which are appropriate for the given data-receiving devices/applications.

Therefore, the aggregation profile will generally capture both the composition of the aggregation and the capabilities of each data-receiving application and/or device within it. In one embodiment the aggregation profile is described through the use of multiple http headers that may be constructed by the data-processing means 300 and included in the single request 812.

For example, consider the case when the data-processing means 300 receives three requests, each including http headers describing the capabilities of the originating data-receiving device and/or application.

First request:
  Data-receiving application-ID: client 1
  Profile: "www.example.com/profile1"

Second request:
  Data-receiving application-ID: client 2
  Profile: "www.example.com/profile2"
    "www.example.com/profile3"

Third request:
    Data-receiving application-ID: client 3
    Profile: "www.example.com/profile2"
        "www.example.com/profile3"
    From these sets of headers the data-processing means 300 constructs the aggregation profile http header set:
Profile-Agg: client1;xx, client2;yy, client3; yy
Profile:xx "www.example.com/profile1"
Profile:yy "www.example.com/profile2"
    "www.example.com/profile3"
    A person skilled in the art will appreciate that the Profile headers are used to indicate web resources which describe the capability sets, and that these Profiles have been bound to the respective data-receiving application ID in the Profile-Agg header of the single request 812.

The aggregation profile may be constructed at the data-processing means 300 in a similar fashion to the processes described above which describe how the single request 812 may be made to the resource server 808 i.e. wait for all requests with the same request group identity and include all profiles in the single request 812 to the resource server 808. Alternatively, the aggregation profile could be included by each data-receiving application in its individual request, assuming that data-receiving applications have a means to discover each other's profiles.

The existing http multipart response mechanism may be extended to transport multiple response variants by using headers to associate each entity part with a data-receiving application. For example:

```
Content-Type = multipart/mixed; boundary=----foobar
----foobar
ForClient: client1
..
[content]
..
----foobar
ForClient: client2,client3
[content]
..
```

Figure 6:
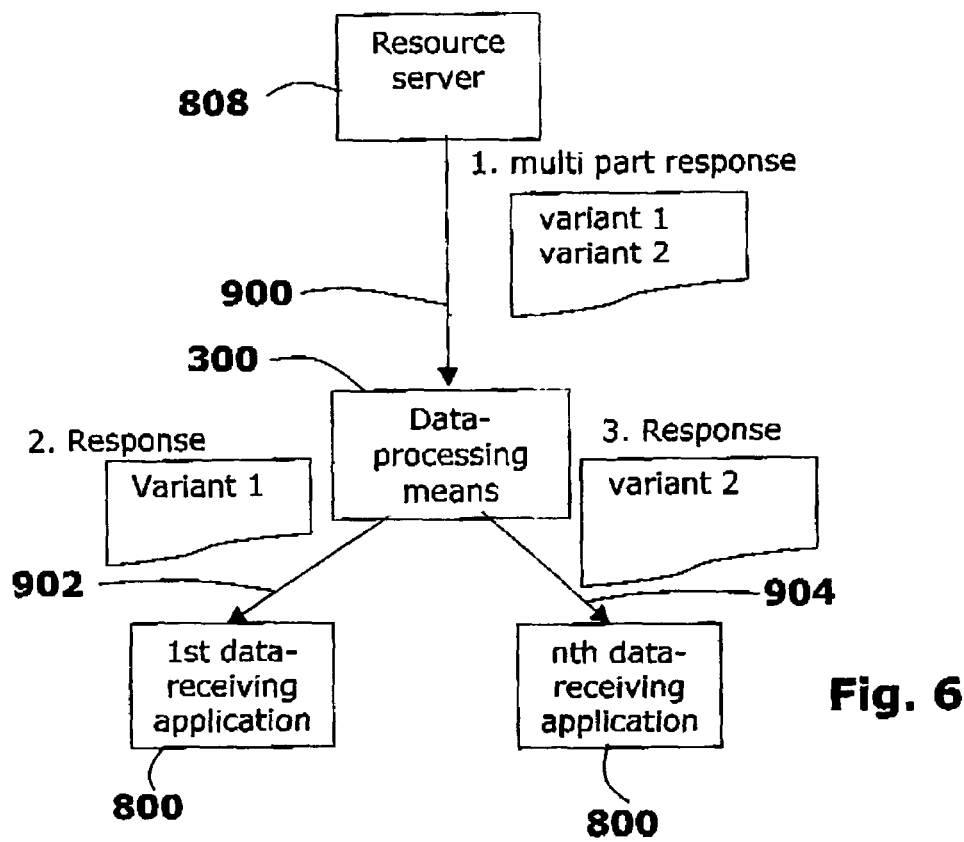
FIG. 6 schematically shows a method of de-multiplexing data sent to a data-processing means.

Instead of treating the multiple entity parts as replacements (which is conventional browser behaviour when receiving multipart entities), the data-processing means 300 would use the ForClient: headers to demultiplex the entity parts within the response 900 from the resource server 808 and include the appropriate part in single-part (initial 902 and copycat 904) responses to individual data-receiving applications 800, which can be more clearly seen in FIG. 6.

In some embodiments a charge may be made for transmitting data to a data-handling device. Payment may be required before data is delivered to the data-handling device. Payment mechanisms will be familiar to the person skilled in the art but may include any of the following: debiting a user account; credit card payments; reversed charged text messages; micropayment mechanism, etc.

What we claim is:

1. A computing device comprising:
    a receiver and transmitter,
    the receiver being arranged to receive a plurality of data requests from a plurality of data-receiving applications, and also to receive data from a store, wherein said plurality of data-receiving applications include a group identity in said plurality of data requests, thus indicating that said plurality of data requests form a request group, and
    the transmitter being arranged to transmit data to said store and to transmit received-data received from said store to said data-receiving applications,
    further, said computing device being arranged to:
        process data requests received by said receiver from said data-receiving applications,
        identify said received data requests as belonging to the group by reading the group identity from the data requests,
    evaluate said data requests, said evaluation campuses one of the following:
        i. stalling said single request until all requests within a request group have been received;
        ii. sending said single request on receipt of the first request within a request group;
        iii. merging data-requests received from said data-receiving applications such that said single request comprises a consolidated request; and
        iv. monitoring requests within a request group and transmitting said single request when the processor has received sufficient data from said data-request to create said single request,
        produce a single request for the data requests within said request group and generated by said evaluation, and
        cause said transmitter to transmit said single request to said data-store and further to receive data from said data-store, process said received-data and to transmit said received data, or portions thereof, to at least one of said data-receiving applications.

2. A computing device according to claim 1 which is arranged such that said evaluation comprises postponing sending said single request until all requests within a request group have been received.

3. A computing device according to claim 1 which is arranged such that said evaluation comprises sending said single request on receipt of the first request within a request group.

4. A computing device according to claim 1 which is arranged such that said evaluation comprises monitoring requests within a request group and transmitting said single request when the computing device has received sufficient data to create said single request from data-requests made thereto.

5. A computing device according to claim 1 which is arranged such that said evaluation comprises merging data-requests received from said data-receiving applications such that said single request comprises a consolidated request comprising at least portions of said data-requests.

6. A computing device according to claim 5 in which the data-requests comprise data providing a portion of a form.

7. A computing device according to claim 5 in which the single data-request comprises data providing all of, or substantially all of, a form.

8. A computing device according to claim 1 which is a proxy server and/or an application running on a data-receiving device and/or a store such as a server.

9. A computing device according to claim 1 which is arranged to use the Hyper Text Transfer Protocol (http) for any of the following: receive data-requests; transmit said single request; receive data from said store; transmit data to said data-receiving applications.

10. A method of requesting data comprising:
    receiving a plurality of data requests from a plurality of data-receiving applications, wherein said plurality of data-receiving applications include a group identity in said plurality of data requests, thus indicating that said plurality of data requests form a request group, evaluating said requests, said evaluation comprises one of the following:
i. stalling single request until all requests within a request group have been received;
ii. sending said single request on receipt of the first request within a request group;
iii. merging data-request received from said data-receiving applications such that said single request comprises a consolidated request; and
iv. monitoring request within a request group and transmitting said single request when the processor has received sufficient data from said data-requests to create said single request, identifying said received data requests as belonging to the request group by reading the group identity from the data requests, producing a single request for data, to a store, for said request group generated by said evaluation, receiving received-data in response to said single request from said store, processing said received-data, and sending said received-data, or portions thereof, to at least one of said data-receiving applications.

11. A system comprising:
at least two data-receiving applications running on one or more data-receiving devices, each data-receiving application being capable of requesting and receiving data,
a data-processor and a data store connected to said data-receiving applications via said data-processor,
said data-processor being arranged to:
 receive a plurality of data-requests from said data-receiving applications, wherein said plurality of data-receiving applications include a group identity in said plurality of data requests, thus indicating that said plurality of data requests form a request group,
 identify said received data requests as belonging to the group by reading the group identity from the data requests,
 evaluate said data-requests said evaluation comprises one of the following:
 i. stalling said single request until all requests within a request group have been received;
 ii. sending said single request on receipt of the first request within a request group;
 iii. merging data-request received from said data-receiving applications such that said single request comprises a consolidated request; and
 iv. monitoring requests within a request group and transmitting said single request when the processor has received sufficient data from said data-requests to create said single request,
 send a single request for the data-requests within said request group to said data store,
 receive data from said data store, in response to said single request,
 process said received data, and
 distribute said received data, or portions thereof, to at least one of said data-receiving applications.

12. A system according to claim 11 in which the data-receiving applications are arranged to communicate with one another via inter data-receiving application messages.

13. A system according to claim 11 in which a data-receiving application is arranged to generate and send a data-request to said data-processor following receipt of an inter data-receiving application message.

14. A system according to claim 11 in which said data-receiving applications are arranged to add to said data request one of the following: the number of data-requests that are to be made to said data-processor, in a data-request group; or a list of the data-receiving applications/devices that are to make a data-request to said data-processor.

15. A system according to claim 11 in which said data-processor is arranged to identify the first data-request received thereby within a data-request group.

16. A system according to claim 15 in which said data-processor is arranged to transmit said single request once said first data-request received has been identified.

17. A system according to claim 15 in which said data-processor is arranged neither to transmit to said store nor respond to said data-requests which are within a data-request group which are not the first data-request received thereby in that data-request group until data has been received from said store in response to said single request transmitted following said first data-request.

18. A system according to claim 11, in which said data-processor is arranged neither to transmit to said data store nor respond to said data-requests within a data-request group until all data-requests in that data-request group have been received thereby.

19. A system according to claim 11 in which said data-processor is arranged to merge data-requests within a data-request group in to a consolidated request, comprising at least portions of said data-requests, and to send said consolidated request as said single request.

20. A system according to claim 19 in which said data-processor is arranged to delay sending said single request to said data store until said data-processor has received sufficient data from said data-requests to create said single request.

21. A system according to claim 20 in which any one data request can comprise any of the following: a partial data-request in which a portion of the data required to generate said single request is provided by that data-request; or a complete data-request in which all of the data required to generate said single request is provided by that data-request.

22. A system according to claim 21 in which said data-processing applications are arranged to add data to said data-requests which identifies whether said data request is partial data-request or a complete data-request.

23. A system according to claim 22 in which said data-receiving applications are arranged to add to said single request the capabilities of said data-receiving application and/or data-receiving device on which said application is running for a single application/device and/or for each application/device within a data-request group.

24. A system according to claim 23 in which said data-processor processes said capabilities received in said data-requests and ensure that said single request includes the capabilities for all data-receiving applications/devices within a request group.

25. A system according to claim 24 in which said data store sends a plurality of versions of the data requested in the single request according to the capabilities listed in the single request.

26. A system according to claim 11 in which the data-processor is any of the following: a proxy server; an application running on a data-receiving device; and/or a store such as a server.

27. A system according to claim 11 which is arranged to use the Hyper Text Transfer Protocol (http) for any of the following: data-requests from the data-receiving applications to the data-processor; single request to said store from said data-processor; receiving data from said store; transmitting data to said data-receiving applications.

28. A method of delivering and receiving data to and from two or more data-receiving applications running on one or more data-receiving devices, said method comprising:
- receiving a plurality of data requests from said data-receiving applications using a data-processor, wherein said plurality of data-receiving applications include a group identity in said plurality of data requests, thus indicating that said plurality of data requests form a request group,
- evaluating said data requests, said evaluation comprises one of the following:
  - i. stalling said single request until all requests within a request group have been received;
  - ii. sending said single request on receipt of the first request within a request group;
  - iii. merging data-requests received from said data-receiving applications such that said single request comprises a consolidated request; and
  - iv. monitoring requests within a request group and transmitting said single request when the processor has received sufficient data from said data-requests to create said single request,
- determining a data-request as belonging to the request group by reading the group identity from the plurality of data requests,
- sending a single request to a data store from the data-processor,
- processing data received from said data store in response to said single request using said data-processor, and
- distributing said received data, or portions thereof, to at least one of said data-receiving applications.

29. A computer readable medium containing instructions, which when read onto a computer cause that computer to perform the method of claim 10.

30. A computer readable medium containing instructions, which when read onto a computer cause that computer to perform the method of claim 28.

31. A computer readable medium containing instructions, which when read onto a computing device cause that computing device to function as the computing device of claim 1.

32. A computer readable medium containing instructions, which when read onto a processor cause that processor to function as the data-processor of claim 11.

33. A computing device which comprises
- a receiver and transmitter,
- the receiver being arranged to receive a plurality of data requests from a plurality of data-receiving applications, and also to receive data from a store, wherein said plurality of data-receiving applications include a group identity in said plurality of data requests, thus indicating that said plurality of data requests form a request group, and
- the transmitter being arranged to transmit data to said store and to transmit received-data received from said store to said data-receiving applications,
- further, said processor being arranged to
  - process requests for data received by said receiver from said data-receiving applications,
  - evaluate said requests said evaluation comprises one of the following:
    - i. stalling said single request until all requests within a request group have been received;
    - ii. sending said single request on receipt of the first request, within a request group;
    - iii. merging data-requests received from said data-receiving applications such that said single request comprises a consolidated request; and
    - iv. monitoring requests within a request group and transmitting said single request when the processor has received sufficient data from said data-requests to create said single request,
  - identify said received data requests as belonging to the group by reading the group identity from the data requests,
  - produce a single request for the data-requests within said request group and generated by said evaluation,
  - cause said transmitter to transmit said single request to said store,
  - receive data from said store,
  - process said received-data, and
  - transmit said received data, or portions thereof, to at least one of said data-receiving applications,
- wherein said computing device is further arranged such that said evaluation comprises one of:
  - postponing sending said single request until all requests within a request group have been received;
  - sending said single request on receipt of the first request within a request group;
  - monitoring requests within a request group and transmitting said single request when the computing device has received sufficient data to create said single request from data-requests made thereto; and
  - merging data-requests received from said data-receiving applications such that said single request comprises a consolidated request comprising at least portions of said data-requests.

34. A processing means comprising:
- a receiver and transmitting means,
- the receiver being arranged to receive a plurality of data requests from a plurality of data-receiving applications, and also to receive data from a storage means, wherein said plurality of data-receiving applications include a group identity in said plurality of data requests, thus indicating that said plurality of data requests form a request group, and
- the transmitting means being arranged to transmit data to said storage means and to transmit received-data received from said storage means to said data-receiving applications,
- said processing means being further arranged to:
  - process data requests received by said receiver from said data-receiving applications,
  - identify said received data requests as belonging to the group by reading the group identity from the plurality of data requests,
  - evaluate said data requests, said evaluation comprises one of the following:
    - i. stalling said single request until all request within a request group have been received;
    - ii. sending said single request on receipt of the first request within a request group;
    - iii. merging data-request received from said data-receiving applications such that said single request comprises a consolidated request; and
    - iv. monitoring request within a request group and transmitting said single request when the processor has received sufficient data from said data-requests to create said single request,
  - produce a single request for the data-requests within said request group and generated by said evaluation, and
  - cause said transmitting means to transmit said single request to said data storage means and further to receive data from said data storage means, process said received data and to transmit said received data, or portions thereof, to at least one of said data-receiving applications.

35. A system comprising:

at least two data-receiving applications running on one or more data-receiving means, each data-receiving application being capable of requesting and receiving data, a data-processing means and a data-storage means connected to said data-receiving applications via said data-processing means, said data-processing means being arranged to:

receive a plurality of data-requests from said data-receiving applications, wherein said plurality of data-receiving applications include a group identity in said plurality of data requests, thus indicating that said plurality of data requests form a request group, evaluate said data-requests, said evaluation comprises one of the following:

i. stalling said single request until all requests within a request group have been received;

ii. sending said single request on receipt of the first request within a request group;

iii. merging data-request received from said data-receiving applications such that said single request comprises a consolidated request; and iv. monitoring request within a request group and transmitting said single request when the processor has received sufficient data from said data-requests to create said single request, identify said received data requests as belonging to the group by reading the group identity from the data requests, send a single request for the data requests within said request group to said data-storage means, receive data from said data-storage means, in response to said single request, process said received data, and distribute said received data, or portions thereof; to at least one of said data-receiving applications.

36. A method of delivering and receiving data to and from two or more data-receiving applications running on one or more data-receiving means, said method comprising:

receiving a plurality of requests for data from said data-receiving applications using a data processing means, wherein said plurality of data-receiving applications include a group identity in said plurality of data requests, thus indicating that said plurality of data requests form a request group, assessing said data requests, identifying said received data requests as belonging to the group by reading the group identity from the plurality of data requests, sending a single request to a data storage means from the data processing means, processing data received from said data storage means in response to said single request using said data processing means, and distributing said received data, or portions thereof, to at least one of said data-receiving applications.

\* \* \* \* \*